Dec. 5, 1950 J. D. REID 2,533,045

SUPERHETERODYNE RADIO RECEIVER

Filed March 16, 1945 2 Sheets-Sheet 1

INVENTOR.
John D. Reid
BY Darby & Darby
ATTORNEYS

Dec. 5, 1950 J. D. REID 2,533,045

SUPERHETERODYNE RADIO RECEIVER

Filed March 16, 1945 2 Sheets-Sheet 2

INVENTOR.
John D. Reid
BY
Daly & Daly
ATTORNEYS

Patented Dec. 5, 1950 2,533,045

UNITED STATES PATENT OFFICE 2,533,045

SUPERHETERODYNE RADIO RECEIVER

John D. Reid, Mount Healthy, Ohio, assignor, by mesne assignments, to Avco Manufacturing Corporation, a corporation of Delaware Application March 16, 1945, Serial No. 583,153

3 Claims. (Cl. 250—20)

Figure 1:
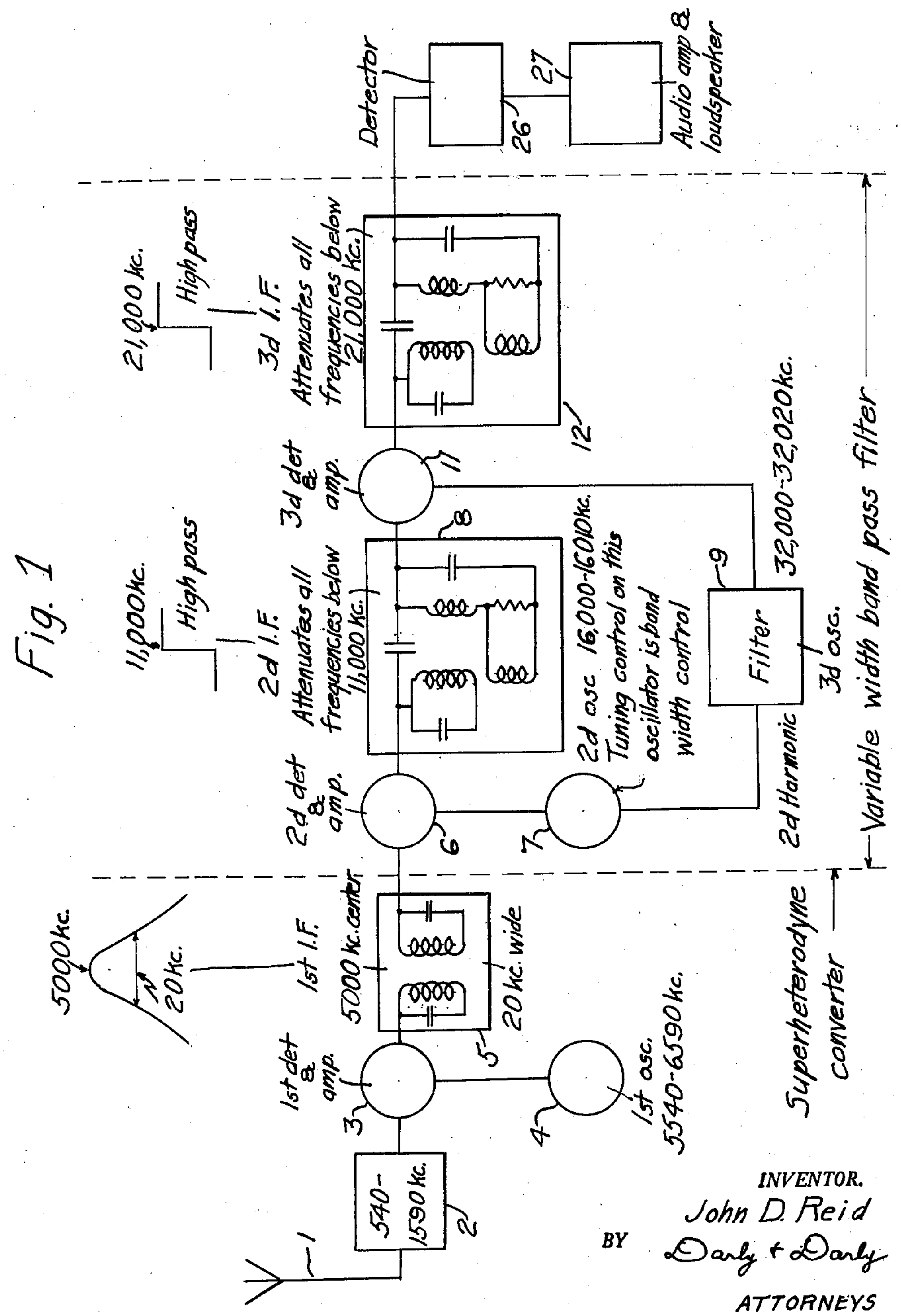

The well known single superheterodyne radio receiver (commonly called the superheterodyne) is a circuit in which there is a local oscillator whose frequency beats with the incoming signal frequency to produce an intermediate frequency which is detected, amplified and translated. A double superheterodyne circuit would have two local oscillators, the first beating with the incoming signal frequency and the second beating with the first intermediate frequency to produce a second intermediate frequency which is detected, amplified and translated. The triple superheterodyne such as here disclosed has three local oscillators, or the equivalent, producing three intermediate frequencies, the last of which is detected, amplified, and translated.

It is well known that the double superheterodyne circuit has certain advantages over the single superheterodyne circuit. For example, in a double superheterodyne circuit in which the output circuits of all tubes are tuned to different frequencies from their input circuits very high stage gains can be attained. One form of the double superheterodyne is described in my copending application Serial No. 573,595, filed January 19, 1945 for Push Button Tuner for Radio Receivers, now Patent No. 2,507,576 issued May 16, 1950. In the device disclosed in that application image and spurious response selectivity is obtained by a higher-than-signal-frequency first I. F. and adjacent channel selectivity is obtained by a lower-than-signal-frequency second I. F.

I have found that by the triple superheterodyne means herein described it is unnecessary to make the succeeding I. F. lower in frequency in order to obtain adjacent channel selectivity. By contrast, with the circuits described each succeeding I. F. may be made higher in frequency, which procedure greatly facilitates an overall performance free from spurious responses or responses to other than the desired signal.

It can be readily seen that if all I. F. frequencies are above the desired tuning band the I. F.'s cannot radiate harmonics which are picked up by the input circuit, thus causing undesired beats with desired signals.

In addition my circuits allow a simple control of received bandwidth or selectivity by means of which the receiver passband may be varied smoothly and continuously over wide limits. This control produces a symmetrical increase in overall bandwidth and does not detune the receiver in respect to the desired signal. In addition I have devised means to use harmonics of my second oscillator in place of a separate third oscillator, thus simplifying operation, simplifying construction, reducing cost, and broadening applications of my circuit.

Attempts have been made to improve the selectivity of superheterodyne circuits by the use of what have been termed infinite rejector circuits, which are described in Griffin Patent No. 2,354,749. They have the property of a very sharp cut-off. That is, when designed for low pass they have the property of very high attenuation of frequencies immediately above a particular desired frequency and very low attenuation of frequencies immediately below the particular frequency. When designed for high pass they have the property of very high attenuation for frequencies immediately below a particular frequency and a very low attenuation for frequencies immediately above a particular frequency.

The overall band width characteristic of a double superheterodyne receiver having infinite rejector circuits may be varied by varying the frequency of the local oscillators, one oscillator operating to narrow or widen the band in the direction of lower incoming signal frequencies, and the other oscillator operating to narrow or widen the band in the direction of higher incoming signal frequencies. If such a receiver as heretofore constructed (for example, Griffin No. 2,354,749) is to receive signal frequencies of equal amounts above and below the selected carrier the two oscillators must each be varied by an amount necessary to cause this result, which amount is different for each oscillator. This makes it necessary that the user of the receiver manipulate two different controls in order to vary the band width, which is, of course, undesirable, and further makes it necessary that he shall manipulate them in correct relation to one another. In the above mentioned Griffin patent, for example, it is mentioned that after the second conversion oscillator is changed in frequency to widen the band in one direction the first oscillator must then be retuned to keep the carrier frequency of the incoming signal, after conversion, in the center of the overall admittance band of the receiver.

An object of this invention is to provide a radio receiver circuit having a single control for variable selectivity and having unusual freedom from image or other spurious responses.

A feature of this invention is the provision of a triple superheterodyne circuit employing high intermediate frequencies with high selectivity.

Another feature of the invention is the provision of a radio circuit of the triple superheterodyne type in which a single control may be used to vary the overall admittance band of the receiver while maintaining the carrier frequency of the incoming selected signal in the center of the overall admittance band.

In my receiver the second and third oscillators, with their associated converters and intermediate frequency circuits, constitute a variable width band pass filter which may be used as such to receive a band of signals of any desired width centered about a selected frequency. The first oscillator and first converter and their associated circuits act as a conventional superheterodyne to change any desired signal to the center feed of the variable width band pass filter. In the special case in which the variable width band pass filter is designed for a specific frequency the first converter and oscillator could be dispensed with and the incoming signal would be connected directly to the input of the second converter (the tube described in this application as the second detector and amplifier 6). Such a variable width band pass filter has many uses, for example in connection with radio test equipment, other than as a radio receiver circuit.

Accordingly, another feature of my invention is the provision of a novel variable width band pass filter circuit comprising a double superheterodyne with only one oscillator.

Figure 2:
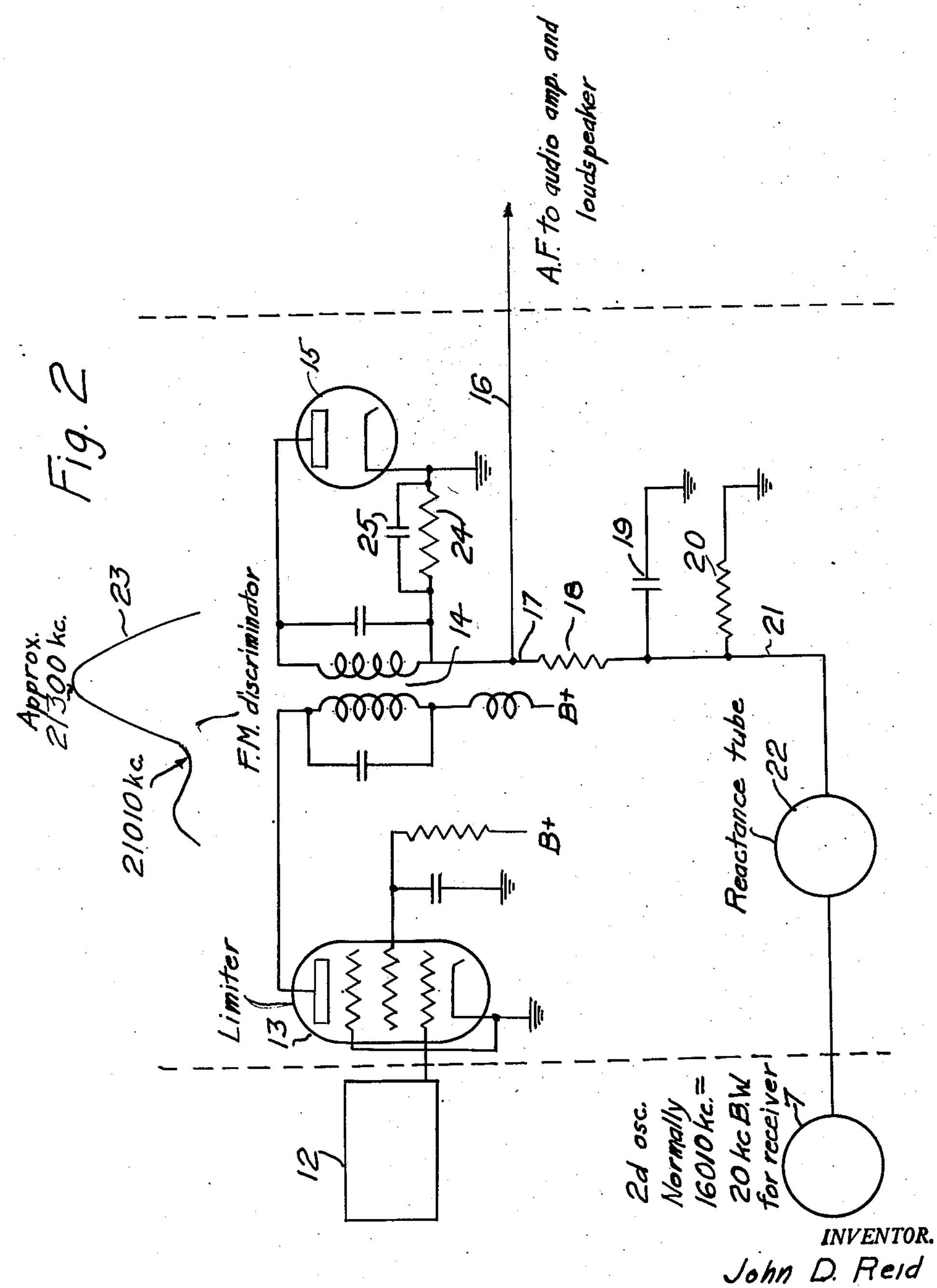

In the drawings,

Figure 1 is a circuit diagram largely in block form of a radio receiver of my invention illustrated for use in reception of standard broadcast band; and Figure 2 illustrates a modification for the reception of frequency modulation signals with automatic band width control.

In the drawings an antenna 1 receives any desired signal in the band, which as now constituted is from 540 kilocycles to 1590 kilocycles. An input circuit 2 which may be tuned to any desired incoming carrier frequency, and may be gang-tuned with oscillator 4, passes the signal to the first converter, marked first detector and amplifier tube 3. The first oscillator 4 is a variable oscillator which may generate any frequency from 5540 to 6590 kilocycles. The first intermediate frequency circuit 5 is designed to pass a band centered at 5000 kilocycles. The band width of this circuit in this example is made 20 kc. wide but may of course be made wider or narrower as may be desired. The band width of the first I. F. should be made as wide as the maximum band width it is desired to receive. If the incoming desired signal is on a frequency of 540 kc., the first oscillator will be tuned to 5540 kc., giving the difference frequency of 5000 kc., and similarly throughout the broadcast band.

The first intermediate frequency of 5000 kc. is supplied to the second converter, marked second detector and amplifier 6. The second oscillator 7 is designed to generate any frequency from 16,000 kc. to 16,010 kc. The tuning control on this oscillator controls the overall acceptance band of the receiver, as will be later explained. The output of this oscillator is supplied to the second detector and amplifier 6, and the difference frequency in respect to the first I. F. frequency is the second intermediate frequency. The second intermediate frequency circuit 8 is a circuit which is designed to sharply attenuate frequencies immediately below 11,000 kc. and to pass with low attenuation frequencies immediately above 11,000 kc. Actually gain is obtained for frequencies immediately above 11,000 kc. An infinite rejection type of circuit, as shown, may be used here. A crystal I. F. or multiple circuit I. F. transformers would also be applicable.

The second harmonic component of the second oscillator 7 in the range of frequencies from 32,000 kc. to 32,020 kc. is filtered by the filter 9. This harmonic selector is in effect the third local oscillator. Its output along with the second intermediate frequency is supplied to the third convertor, marked third detector and amplifier 11, which selects and amplifies the difference frequency between the frequency of the second intermediate frequency and the frequency of the third oscillator. This difference frequency is the third intermediate frequency which is supplied to circuit 12, which sharply attenuates frequencies immediately below 21,000 kc. and has a low attenuation for frequencies immediately above 21,000 kc. This circuit is illustrated as an infinite rejection type of coupling. The output of the third intermediate circuit is supplied to a detector, audio amplifier, and loud speaker in accordance with standard practice.

To avoid beats caused by harmonics of the first oscillator, the second oscillator and the second and third I. F. should be chosen so as to avoid harmonics of the first oscillator. None of the I. F.'s should be in harmonic relation and the first I. F. should be at least twice the highest frequencies to be received.

It will be noted that in my circuit the output of every stage is tuned to a different frequency from the input. This permits a very high gain with a minimum of feedback so that little, if any, shielding is necessary.

In describing the operation of this circuit let us first assume that the desired incoming signal has a carrier frequency of 1,000 kc. The first oscillator would then be tuned to 6,000 kc. producing with the carrier a first intermediate frequency of 5,000 kc. The second oscillator will first be considered as being tuned to 16,000 kc., producing with the converted carrier of 5,000 kc. a second intermediate frequency of 11,000 kc. The third oscillator, being the second harmonic of the second oscillator, will be a 32,000 kc. wave, producing in converter 11 with the second converted carrier of 11,000 kc., a third intermediate frequency of 21,000 kc.

With the second oscillator tuned to 16,000 kc. the receiver would not pass a band of frequencies which would be useful for listening to the usual radio programs as it would pass only a single signal frequency of 1,000 kc. without any side bands. First let us consider what would happen under these conditions to a side band which was at a frequency of 995 kc. As the first oscillator is tuned to 6,000 kc., this side band would produce a first intermediate frequency of 5,005 kc. which would, of course, be passed by the first intermediate frequency circuit. As the second oscillator is tuned to 16,000 kc. this frequency of 5,005 kc. will be converted in the second detector and amplifier to a frequency of 10,995 kc. As the second intermediate frequency circuit sharply attenuates frequencies below 11,000 kc. this side band would not pass through the second intermediate frequency circuit but would be rejected therein, as would all other side bands below 1,000 kc.

Let us next consider what happens under the same conditions to a side band of 1,005 kc. As the first oscillator is tuned to 6,000 kc. it is converted in the first detector and amplifier to a frequency of 4,995 kc., which will pass the first intermediate frequency circuit. As the second oscillator circuit is tuned to 16,000 kc. the side band under consideration will be converted to a frequency of 11,005 kc. As the second intermediate frequency amplifier circuit passes frequencies above 11,000 kc. this frequency will pass this circuit. As the third oscillator, i. e. the second harmonic of the second oscillator is 32,000 kc. the side band under consideration will be converted in the third detector and amplifier to a frequency of 20,995 kc. As the third intermediate frequency circuit rejects frequencies below 21,000 kc. this side band will be rejected in this circuit. It is thus seen that with the second oscillator tuned to 16,000 kc., only the single signal frequency of 1,000 kc. would be accepted in the overall circuit of the receiver. While not useful for receiving broadcast programs, such a result would be useful for code.

To broaden the overall band reception characteristic of the receiver all that is necessary is to vary the tuning of the second oscillator so as to increase its frequency. If it is desired to receive a band which is exactly 10 kc. wide, for example, the tuning of the second oscillator will be changed from 16,000 kc. to 16,005 kc. It may be noted at this point that the second oscillator serves no function in tuning the receiver to a desired signal, its only function so far as the user of the set is concerned being to vary the band width received.

With the second oscillator tuned to 16,005 kc. let us again consider the reception of an incoming signal on a carrier of 1,000 kc. carrying double side bands of 5 kc. on each side of the carrier.

Considering first the carrier frequency of 1,000 kc. the first oscillator will, as before, be tuned to 6,000 kc. and the incoming carrier converted to 5,000 kc. which will pass the first intermediate frequency circuit. The second oscillator is now tuned to 16,005 kc. so the second intermediate frequency produced by the signal of 1,000 kc. will be 11,005 kc. As the second intermediate frequency circuit passes frequencies above 11,000 kc. this frequency will be passed and it will be noted that it is exactly 5 kc. above the lowest frequency which will be passed by this circuit. The third oscillator, i. e. the second harmonic of the second oscillator, will be a frequency of 32,010 kc. so that the second I. F. frequency of 11,005 kc. under consideration will now be converted to a frequency of 21,005 kc. As the third intermediate frequency circuit passes frequencies above 21,000 kc. this frequency will be passed by this circuit, and it is noted that it is exactly 5 kc. above the lowest frequency which will be passed by this circuit.

With the second oscillator still tuned to 16,005 kc. let us now consider what happens to an incoming side band of 995 kc. The first oscillator will still be tuned to 6,000 kc. producing a first intermediate frequency of 5,005 kc. which will pass the first intermediate frequency circuit. The second oscillator will be tuned to 16,005 kc. producing a second intermediate frequency of 11,000 kc. As the second intermediate frequency circuit passes frequencies at or above 11,000 kc. this frequency will pass the second intermediate frequency circuit. It is to be noted at this point that the side band under consideration is the lower side band of the carrier frequency of 1,000 kc., and that it is at the edge of the second intermediate frequency rejector circuit. The third oscillator at a frequency of 32,010 kc. will convert the 11,000 kc. second I. F. signal under consideration to 21,010 kc., which will be passed by the third intermediate frequency circuit.

Let us now consider what happens to the other side band at a frequency of 1,005 kc. with the first oscillator still tuned to produce a carrier frequency of 6,000 kc. and the second oscillator still tuned to 16,005 kc. The first oscillator being tuned to 6,000 kc. will produce a first intermediate frequency of 4,995 kc., which will, of course, pass the first intermediate frequency circuit. The second oscillator being tuned to 16,005 kc. will convert the side band under consideration to a frequency of 11,010 kc. As the second intermediate frequency circuit passes frequencies above 11,000 kc. this frequency will be passed by this circuit. The third oscillator at a frequency of 32,010 kc. will convert the second I. F. frequency of 11,010 kc. under consideration to 21,000 kc. As the third intermediate frequency circuit passes frequencies at and above 21,000 kc. this frequency will be passed. It is noted that this higher side band of the incoming desired carrier frequency is just at the edge of this circuit.

It was noted above that the lower side band of 995 kc. was just at the edge of the rejector characteristic of the second intermediate frequency circuit, so that a lower side band of 994 kc. would have been rejected in this circuit. It has just been noted that the higher side band of 1,005 kc. was just at the edge of the rejector frequency of the third intermediate frequency circuit so that a side band higher than 1,005 kc. would have been rejected in this circuit. It is thus seen that although both the second and third intermediate frequency circuits are of the high pass type one of them, namely the second intermediate frequency circuit, passes more and more of the lower side bands as the frequency of the second oscillator is increased while the other one, namely the third intermediate frequency circuit, passes more and more of the higher side bands as the frequency of the second oscillator is increased. The explanation of this apparent paradox is simply that the third oscillator circuit is higher in frequency than the second intermediate frequency, and the third intermediate frequency circuit is designed to accept the difference frequency between the frequencies of the second intermediate circuit and the third oscillator. The signal is, in effect, turned over in frequency, higher side bands being represented by lower frequencies in the third intermediate frequency circuit.

When the incoming carrier frequency of 1,000 kc. was considered above in connection with the tuning of the second oscillator to 16,005 kc. (and the third oscillator at 32,010 kc.) it was noted that this signal frequency produced a second intermediate frequency of 11,005 kc. and a third intermediate frequency of 21,005 kc., in each case just 5 kc. from the edge of the overall accepted band. That is, the center of the accepted band at the second intermediate frequency was 11,005 kc. while the center of the overall accepted band at the third intermediate frequency was 21,005 kc. Thus, it will be seen that the incoming signal carrier frequency remains at the center of the overall acceptance band of the set with any variation of the second oscillator frequency. In order to accomplish this it is necessary that if the second oscillator is varied in any amount the third oscillator is varied in twice that amount. That is, if the second oscillator is varied by 5 kc. or from 16,000 kc. to 16,005 kc. the third oscillator must be varied by 10 kc. or from 32,000 kc. to 32,010 kc. This does not mean that the frequency of the second oscillator must be twice that of the first oscillator. For example, if the third intermediate frequency circuit were chosen to attenuate all frequencies below 20,000 kc., then with the second oscillator at 16,000 kc. and the third oscillator at 31,00 kc. only the single carrier frequency of 1,000 kc. would be received with the first oscillator tuned to 6,000 kc., and under the same conditions but with the second oscillator tuned to 16,005 kc. and the third oscillator tuned to 31,010 kc. the overall acceptance band of the receiver would be 10 kc. wide center at a signal frequency of 1,000 kc. Thus the change in the frequency of the third oscillator must be twice the change in the frequency of the second oscillator to keep the band centered.

To put it another way, the center of the band is in effect moved over 5 kc. from the rejector frequency of the second intermediate frequency circuit when the second oscillator is tuned to 16,005 kc. so that the second intermediate frequency circuit passes the lower side band of 5 kc. In order to permit the higher side band of 5 kc. represented by signal frequencies of 1,000 kc. to 1,005 kc. to pass the third intermediate frequency circuit it is in effect necessary to move the carrier frequency over 10 kc. so that the upper side band will be just 5 kc. away from the rejector frequency of the third intermediate frequency circuit.

This relationship is most easily and simply attained by using the second harmonic of the second oscillator as the third oscillator instead of using a separate third oscillator. It not only saves the use of one independent oscillator, but it permits a single oscillator to be controlled as to its frequency for changing the overall band width characteristic of the receiver, the frequency of the second harmonic changing automatically as the frequency of the second oscillator is changed.

It was noted above that the side bands are in effect turned over in the third converter 11. That is, a lower side band of signaling frequency becomes a higher converted frequency and a higher side band of signaling frequency becomes a lower converted frequency. This is accomplished by using a third oscillator frequency which is higher than the second intermediate frequency and taking the difference between these frequencies in the output of the third converter. If the third oscillator had a lower frequency than the second intermediate frequency, or if the sum of the frequencies of the third oscillator and the second intermediate frequency had been taken in the output of the third converter, these side bands would not have been turned over. In order to turn the side bands over it is necessary that the third oscillator be at a higher frequency than the second intermediate frequency and that the difference frequency be taken. In order for my circuit to operate as a variable band pass circuit it is necessary to turn the side band over at this point. Otherwise upper side bands of the desired signal frequency will appear as upper side bands of both the second and third intermediate frequencies and will be passed through the second and third intermediate frequency circuits along with still higher, and undesired, signals there being under these circumstances no circuit designed to cut off the upper side band at the desired limit.

By using a third oscillator which is higher in frequency than the second intermediate frequency and selecting the difference frequency as the third intermediate frequency I am able to obtain a practical band width control.

By using sharp cut-off circuits I am able to use high intermediate frequencies with high selectivity and high gain. By using a triple superheterodyne circuit I am able to use two oscillators for band width control which are independent of the tuning of the receiver, and which produce the desired high intermediate frequencies. By using the second harmonic of the second oscillator as the third oscillator I am able to use only a single control knob for band width control, but nevertheless to keep the selected carrier frequency at the center of the selected band.

While my application has been described above in connection with the use of infinite rejector circuits, it is to be understood that it is not restricted to this type of circuit. For example, the second and third intermediate frequency circuits of Figure 1 could be simple band pass circuits in which in each case the lower side of the circuit cuts off at the frequencies indicated, namely 11,000 kc. and 21,000 kc., respectively. The band pass circuits would be made as wide as the widest band it is desired to receive. Similarly, high-pass filters of any well known type such as shown, for example, on page 229 of Terman's Radio Engineers Handbook, First Edition, published by McGraw Hill in 1943, could be used for the second and third intermediate frequency circuits. Another alternative would be to use quartz crystals as the reactance element of the coupling circuits for the second and third I. F.'s.

It is also to be noted that the second and third intermediate frequencies could be reversed if desired. That is, using the same frequency for the first oscillator and the same first intermediate frequency circuit, the same frequency for the second oscillator and still taking the second harmonic for use as the third oscillator, the only change necessary in the circuits would be to change the second intermediate frequency circuit to attenuate frequencies below 21,000 kc. and to change the third intermediate frequency circuit to attenuate frequencies below 11,000 kc., i. e. interchange the second and third I. F. circuits. In this case the second intermediate frequency circuit would be tuned to the sum of the first intermediate frequency and second oscillator frequency rather than the difference as shown, but this would not alter the operation of the circuit as to the band width control or as to the side band rejected. As noted before, it is necessary to turn over the side bands in the third intermediate frequency circuit with respect to the second intermediate frequency circuit in order to effect the band width control and this will still be done. The fact that the second intermediate frequency circuit is tuned to the sum of the two frequencies rather than the difference does not alter this relationship with respect to the second and third intermediate frequencies, as it is the tuning of the third intermediate frequency to the difference frequency which turns the side band over where this is necessary.

In Figure 2 I have shown a modification of my invention as applied to reception of frequency modulation signals and incorporating automatic band width control. This automatic band width control will enable an improvement in the signal to noise ratio of the receiver to be obtained as the band width of the receiver will automatically adjust itself to that width required for satisfactory reception of the particular deviation of the transmitter. It is well known that receiver or random noise varies as the square root of the receiver band width and electrical or pulse noise increases directly with the band width. This automatically varying band width also affords an increase in selectivity as the receiver pass band is always a minimum permissible band width and thus affords a maximum protection from adjacent channel interference.

In the circuit of Figure 2 it is assumed an incoming FM signal is first converted to a first intermediate frequency centered at 5,000 kc., and that there is a variable width band pass filter identical with Figure 1, which terminates in a third intermediate frequency circuit 12, which is illustrated in block form in Figure 2.

In this circuit when frequency modulation signals are received, the output of the third intermediate frequency circuit 12 is supplied to a limiter 13 the output of which is supplied to an FM discriminator circuit 14 of the slope type, and diode detector 15. The audio output of the detector is supplied to an audio amplifier and loudspeaker as before through lead 16. An audio frequency control voltage appears on lead 17. A filter or time constant circuit consisting of resistance 18 and condenser 19 smooths out the audio variations, or integrates the voltage, so that it varies at a rate below the lowest audio voltage desired. A resistor 20 forms with the resistance 18 a voltage divider to secure the desired amount of voltage for frequency control. The voltage appearing at the lead 21, therefore, will increase with the average increase in audio voltage and vice versa. This voltage is supplied to a reactance tube 22 which controls the frequency of the second oscillator 7 in a known manner, as shown for example in Koch Patent No. 2,282,974. In receiving FM signals, as these may be wide band signals, the first intermediate frequency circuit may be made a band pass circuit of 200 kc. width and the second and third intermediate frequency circuits will then preferably be band pass circuits of the same width. The band width of all I. F.'s should be somewhat wider than the widest deviation to be expected from the transmitter. The tuning of the second oscillator 7 may be normally 16,010 kc. In operation the gain will be sufficient so that due to noise, such as receiver noise, the limiter will be operating at saturation and this will produce enough voltage on the lead 21 so that the second oscillator will be operating at approximately 16,010 kc., thus establishing an initial frequency of operation for this oscillator and accordingly an initial band width to which the receiver will respond. Under these conditions, reception of a steady carrier will not change the steady state voltage conditions and, therefore, with the reception of an undeviated carrier frequency alone the second oscillator will continue to produce a frequency of 16,010 kc. The point on the slope circuit corresponding to this undeviated carrier will be at a frequency corresponding to 21,010 kc. If now the transmitted carrier is deviated about its center frequency, deviations on both sides of 21,010 kc. will appear on the slope circuit of the discriminator. The FM discriminator transformer 14 is of the over-coupled type and, therefore, may have a frequency characteristic illustrated by the curve 23 appearing above it. As the point on the discriminator slope corresponding to 21,010 kc. is at a point close to but above where this slope changes from a non-linear to a linear characteristic with increasing frequency, a deviation of the carrier will produce on the average a larger output voltage on the lead 21. This increase in voltage will increase the frequency at which the second oscillator is tuned, thereby increasing the acceptance band of the receiver so that as larger and larger deviations are received the second oscillator frequency is increased, thus allowing the receiver to accept these large deviations.

The resistance 18 will be made small compared to the resistance 24 in the detector circuit and the condenser 19 will be larger than the condenser 25 in the detector circuit. This will cause the voltage on lead 21 to rise rapidly with an increase in average deviation but to drop relatively slowly with a decrease in average deviation. Accordingly when a deviated carrier signal is received the voltage on lead 21 will rise rapidly and increase the frequency of the second oscillator rapidly. Accordingly, the center frequency of the overall received band will rise rapidly on the slope of the discriminator circuit and the distortion introduced by the non-linearity below the point 21,010 kc. will be of short duration. If the signal deviations should now decrease for a short time, there will be no distortion as some time is required for the voltage on lead 21 to decrease sufficiently to cause the second oscillator to decrease so that the frequency on the slope circuit moves down to a point where any deviations will be on a non-linear portion of this circuit. If the deviations should increase before that point is reached, the average frequency on the slope circuit will again move up so that there will be no distortion. Thus the only condition under which there will be any distortion in the slope circuit with either large or small deviations will be when a small deviation persists for a length of time exceeding the time required for the frequency control voltage on lead 21 to decrease to its minimum value. By increasing the initial band width with no signal the occurrence of the distortion can be reduced but at a sacrifice of increased noise.

It will be obvious that my circuit is easily adapted to a combined amplitude modulation and frequency modulation receiver. It may be used as a frequency modulation receiver without the automatic band width control by simply switching the output of the third intermediate frequency circuit 12 from the detector illustrated in Figure 1 to the limiter illustrated in Figure 2. For automatic band width control with frequency modulation, the same switch may control the switching in of the automatic frequency control circuit of Figure 2 so that this feature is also operative for the reception of frequency modulation signals with a single switching operation. For frequency modulation reception the audio amplifier and loudspeaker illustrated in Figure 2 would also be controlled by the same switching operation so that it would be connected to the lead 16 of Figure 2 instead of to the detector tube 26 of Figure 1.

It will be understood by those skilled in the art that my invention is capable of various modifications and that the circuit illustrated is merely illustrative. I do not desire, therefore, to be restricted to the particular details of the circuit shown and described, but only within the scope of the appended claims.

What is claimed is:

1. A filter circuit for passing a band of frequencies of variable width centered about a particular frequency comprising an oscillator which may be varied in frequency, a frequency converter coupled to the output of said oscillator and connected to an incoming signal, a network coupled to the output of said converter having a high attenuation for frequencies on one side and a low attenuation for frequencies on the other side of a critical frequency corresponding to said particular converted frequency, a second harmonic selector coupled to the output of said oscillator, a second converter coupled to the outputs of said harmonic selector and said network, and a second network coupled to the output of said second converter, said second network having a high attenuation for frequencies on one side and a low attenuation for frequencies on the other side of a second frequency corresponding to said particular second converted frequency, the characteristics of said networks being complementary to give the filter an overall band pass characteristic such that for each cycle variation in tuning of said oscillator from a frequency such as to produce said critical first converted frequency from said particular frequency said overall band pass characteristic will be widened by two cycles.

2. A filter circuit for passing a band of frequencies of variable width centered about a particular frequency, comprising a variable oscillator, a frequency converter coupled to the output of said oscillator and connected to an incoming signal, a network coupled to the output of said converter having a high attenuation for frequencies below and a low attenuation for frequencies above a critical frequency which is a resultant of beating the initial frequency of said oscillator and said particular frequency, a second harmonic selector coupled to the output of said oscillator, a second converter coupled to the outputs of said network and said harmonic selector, and a second network coupled to the output of said second converter having a high attenuation for frequencies above and a low attenuation for frequencies below a critical frequency which is the difference between said first critical frequency and the second harmonic of said initial oscillator frequency.

3. A signal translating circuit having an adjustable over-all band width comprising a first frequency-changing circuit including a tunable source of oscillations for converting modulated carrier signals into first intermediate frequency signals with inverted side bands, said intermediate frequency being higher than the carrier frequency of said modulated carrier signals, a sharp cutoff high-pass selective circuit coupled to said first frequency-changing circuit, the frequency limit of said selective circuit being equal to a predetermined intermediate frequency whereby said selective circuit rejects an increasing portion of one side band of said modulated carrier signals when said tunable source is tuned to cause said intermediate frequency signals to approach said predetermined frequency, a second frequency changing circuit, including a second tunable source of oscillations for generating oscillations which are second harmonically related to those generated by the first-mentioned source, for converting said first intermediate frequency signals into second intermediate frequency signals with reinverted sidebands, the last-named signals having a higher frequency than said carrier signals, another sharp cutoff high-pass selective circuit coupled to said second frequency-changing circuit, the frequency limit of said other selective circuit being equal to a second predetermined intermediate frequency, whereby said other selective circuit rejects an increasing portion of the other side band of said carrier signals when said first tunable source is tuned to cause said second intermediate frequency signals to approach said second predetermined frequency, both of said selective circuits and both of said frequency-changing circuits cooperating to contract the over-all band pass of the signal translating circuit in response to decreasing output-signal frequencies of said sources.

JOHN D. REID.

REFERENCES CITED

The following references are of record in the file of this patent:

UNITED STATES PATENTS

| Number | Name | Date |
|---|---|---|
| 2,115,676 | Wheeler | Apr. 26, 1938 |
| 2,205,762 | Hansell | June 25, 1940 |
| 2,212,240 | Lalande | Aug. 20, 1940 |
| 2,216,160 | Curtis | Oct. 1, 1940 |
| 2,245,385 | Carlson | June 10, 1941 |
| 2,261,374 | Koch | Nov. 4, 1941 |
| 2,282,974 | Koch | May 12, 1942 |
| 2,362,000 | Tunick | Nov. 7, 1944 |
| 2,416,791 | Beverage | Mar. 4, 1947 |